No. 854,362. PATENTED MAY 21, 1907.
J. F. KELLY.
GENERATION AND DISTRIBUTION OF ENERGY.
APPLICATION FILED APR. 15, 1903. RENEWED MAY 21, 1904.

2 SHEETS—SHEET 1.

Witnesses
Frank S. Ober
L. Vreeland

Inventor
John F. Kelly
By his Attorney
R. . Mitchell

No. 854,362. PATENTED MAY 21, 1907.
J. F. KELLY.
GENERATION AND DISTRIBUTION OF ENERGY.
APPLICATION FILED APR. 15, 1903. RENEWED MAY 21, 1904.

2 SHEETS—SHEET 2.

High resistance material

Witnesses
Frank D. Ober
L. Vreeland

Inventor
John F. Kelly
By his Attorney

UNITED STATES PATENT OFFICE.

JOHN FORREST KELLY, OF PITTSFIELD, MASSACHUSETTS.

GENERATION AND DISTRIBUTION OF ENERGY.

No. 854,362.   Specification of Letters Patent.   Patented May 21, 1907.

Application filed April 15, 1903. Renewed May 21, 1904. Serial No. 209,043.

*To all whom it may concern:*

Be it known that I, JOHN FORREST KELLY, a citizen of the United States, residing at Pittsfield, Berkshire county, and State of Massachusetts, have invented certain new and useful Improvements in Generation and Distribution of Energy, of which the following is a full, clear, and exact description.

My invention relates to improvements in the generation and distribution of energy by alternating currents and has for its object to provide a system in which the generator shall be partially self-exciting and not be affected by the presence of lagging currents upon the mains and shall automatically act to neutralize the drop due to loading.

My invention is an improvement upon the apparatus shown and described in United States Letters Patent Nos. 712,613 and 712,614 to William Stanley and myself, dated November 4th, 1902, and consists in providing means whereby the main generator is made more independent of the exciter and whereby the drop caused by the load is prevented. The means and method whereby the main generator is rendered more independent of the exciter results in permitting the use of an exciter which is less closely self-regulating, and, consequently, an exciter which is smaller and less expensive than would otherwise be required. In carrying out my invention, I make the alternator practically self-exciting, the exciter under normal conditions doing little, if anything, more than to determine the periodicity of the current generated by the main generator with a given mechanical motion.

Figure 1:
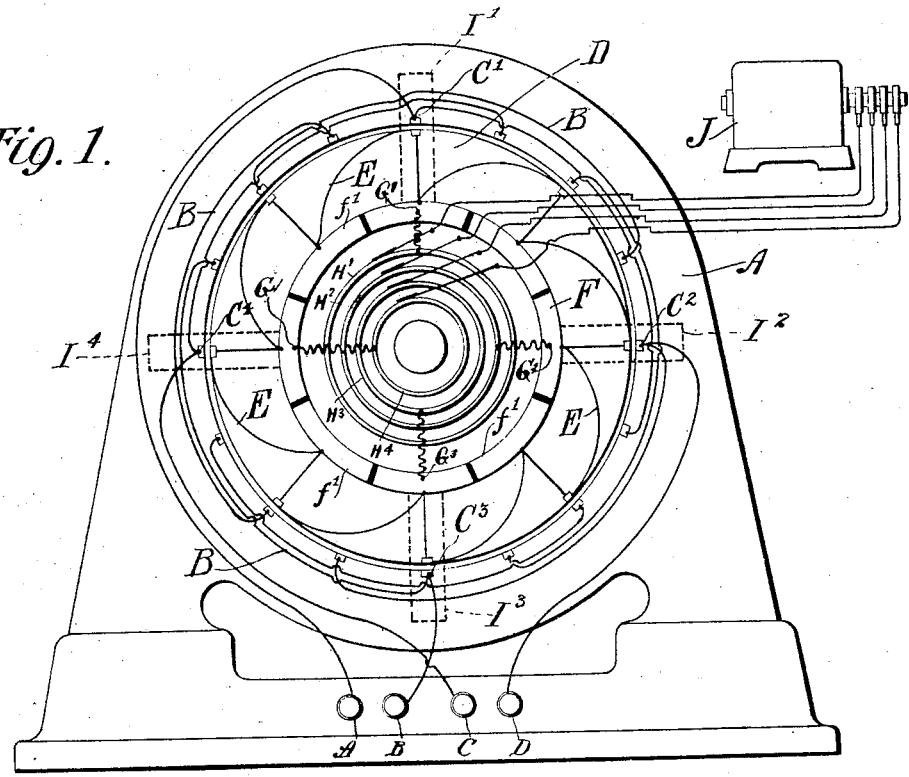
Figure 2:
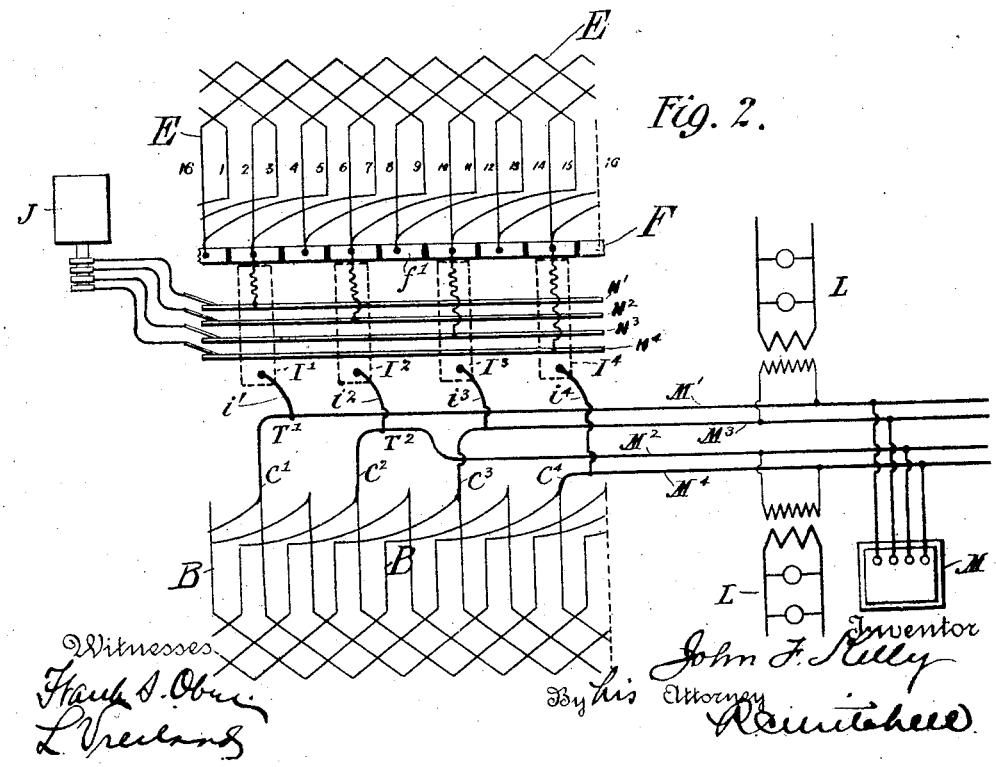
Figure 3:
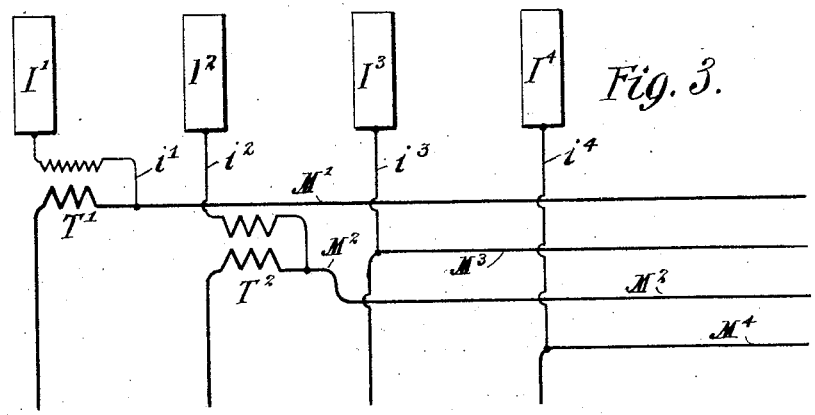
Figure 4:
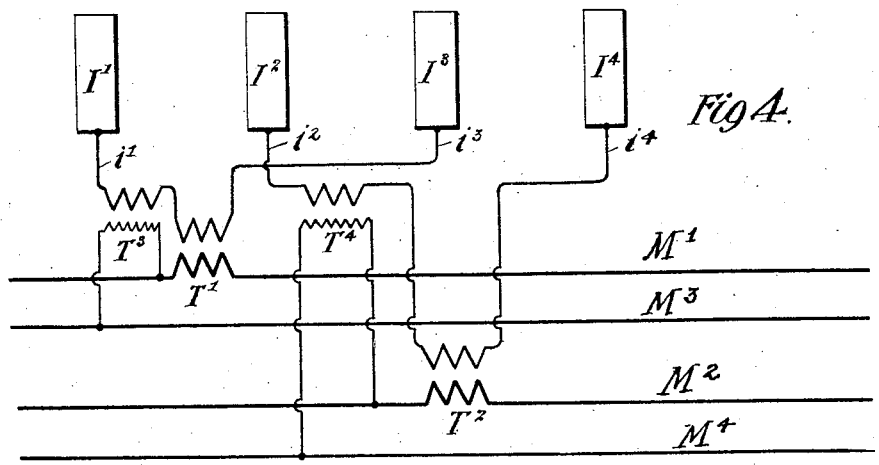
Figure 5:
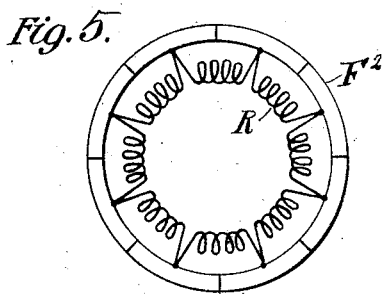
Figure 6:
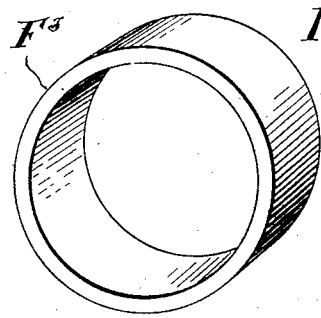

The following is a description of a system embodying my invention, reference being had to the accompanying drawings, in which Figure 1 shows a main generator and an auxiliary exciting generator. Fig. 2 is a diagram of the main generator windings and parts of the system. Fig. 3 is a diagram of a modification, Fig. 4 is a further modification. Figs. 5 and 6 show other forms of commutators that may be used in place of that shown in Fig. 1.

Referring more particularly to the drawings, A is a stationary armature having a closed circuited distributed winding B tapped at four points $C'$ $C^2$ $C^3$ $C^4$.

D is a rotating iron core carrying the closed circuited distributed field-windings E, preferably of the drum type, connected to the segments $f'$ of the commutator F and tapped at four points $G'$ $G^2$ $G^3$ $G^4$ which are connected to slip-rings $H'$ $H^2$ $H^3$ $H^4$. Upon the commutator segments $f'$ of the commutator, brushes $I'$ $I^2$ $I^3$ $I^4$ bear, which brushes are connected with the armature circuits as by connection with the mains $M'$ $M^2$ $M^3$ $M^4$ by conductors $i'$ $i^2$ $i^3$ $i^4$ (as shown in Fig. 2.)

J is a two-phase auxiliary generator of low periodicity supplying two-phase currents to the field-winding through the slip-rings $H'$ $H^2$ $H^3$ $H^4$.

L L and M are respectively lamps and motors in the work circuit.

In the modification shown in Fig. 3 $T'$ $T^2$ are transformers having their primaries in the supply-mains $M'$ $M^2$ and their secondaries in conductors $i'$ $i^2$ leading to the brushes $I'$ and $I^2$ respectively for the purpose hereinafter stated.

In the modification shown in Fig. 4, the brushes are inductively connected in the derived circuits from the mains by additional step-down transformers $T^3$ $T^4$ which reduce the potential applied to them. The secondaries of these transformers are in series with the secondaries of the transformers $T'$ $T^2$ which act as in Fig. 3. for the purpose hereinafter explained.

As in the invention set out in the patents above referred to, the windings on both elements of the main generator are distributed; the field-windings have high inductance relatively to their resistance so that the inductance controls the flow of the magnetizing current the same as in the primary of a static transformer, and the exciter has a periodicity or frequency low relatively to the normal frequency.

The theory of operation of my invention will be made more clear from the following: It is well known that by means of a commutating device alternating currents may be transformed into direct currents and vice versa, and also that by the same means the frequencies of alternating currents may be varied. For instance, if we take an ordinary armature provided with a commutator of the Gramme type and by means of two pairs of brushes resting on the commutator supply the winding with two-phase currents of any frequency, the currents in the winding will so long as it is stationary alternate with a frequency equal to the frequency of the supply and the magnetic field due to the currents will rotate about the axis at a corresponding rate. If, however, the brushes be moved backward at the same rate that the field tends to move forward, the current in the winding will not reverse and the magnetic field will be stationary. If the brushes are moved more slowly the current will alternate in the windings at the rate fixed by the difference of the impressed frequency and the rate of the rotation of the brushes, and the magnetic field will move forward at a corresponding rate. If the brushes are held stationary and the armature structure is moved forward, it is obvious that, with respect to the armature structure itself, the result is the same as though the armature was stationary and the brushes moved backward; i. e., the magnetic field will be stationary relatively to the armature. If, therefore, polyphase alternating currents be fed into a rotating winding similar to a ring or drum winding, through a commutator moving with the winding, in such a direction that the rotray field produced will turn in the direction of the mechanical motion, then the commutator will produce in the winding a frequency equal to the difference in polar speed of the rotary field and the mechanically rotated field and the rotary magnetic field will move about the structure at this same differential frequency.

Referring now to the arrangement shown in Fig. 2, which presents diagrammatically a two-phase generator supplying a two-phase system, it will be seen that, as explained in Patents Nos. 712,613 and 712,614 above referred to, the exciter J will produce a slowly rotating magnetic field in the field-winding E and if the field structure with its winding E is rotated in the same direction, the currents induced in the armature windings B will have a frequency equal to the arithmetical sum of the frequencies which would be produced therein by either movement acting alone; i. e., the frequency of the mains is that due to mechanical rotation plus that due to the exciter frequency. The four brushes I' I² I³ I⁴ bear upon the commutator segments f' and are connected to the mains M' M² M³ M⁴, so that a rotary field will also tend to be produced by alternating currents in the windings E supplied from the armature circuits, the direction of rotation being the same as that produced by the currents from the exciter J. If the field structure be rotated mechanically in the same direction as this rotating field, the alternating currents so impressed on the field windings will have a frequency equal to that of the mains less the frequency corresponding to the mechanical rotation of the field structure, that is, would have a frequency equal to the exciter frequency. Therefore the exciter frequency and that supplied from the armature circuits through the commutator will coincide and the one may be substituted for the other or the two may act together. In my system I combine the two setting the brushes so that the currents from the two sources are in phase and combine their magnetic effects. When this is done the whole work of excitation may by the adjustment of the electromotive forces be thrown back upon the alternator itself, on which it would constitute but a trifling load. It is, of course, understood that by lowering the frequency by means of the commutator the apparent energy required for the production of a given magnetic flux is enormously reduced as this lies at the base of the prior invention. It is clear therefore that the energy required for excitation may be derived from the armature circuits of the alternator itself. This is not, however, equivalent to saying that the exciter may be dispensed with, since it continues to determine the frequency and must be retained for that purpose. An entirely self-exciting alternator would have no definite frequency. The exciter, however may evidently be greatly reduced in size as compared with that which would have to be used if the exciter supplied the whole exciting energy. The exciter while still in circuit for the first main generator may be able to excite a second main generator while it is being put into operation and determine the frequency of that machine also. The brushes I' I² I³ I⁴, except where the mains are of very low potential, would be inductively connected to the derived circuits through step down transformers T³ T⁴ as shown in Fig. 4.

In order to compound the machine so as to compensate for any resistance drop, I insert the primaries of the transformers T' T² in the mains M' M² leading to the two supply-circuits relatively as shown in Figs. 3 and 4. These transformers thus have their primaries in series with the armature windings and with the load in their respective circuits and their secondaries are connected in the conductors leading to the brushes I' and I² respectively. This results in causing the energizing currents which are fed in through the commutator to have impressed upon them additional electromotive forces varying with the currents supplied by the two circuits to their respective translating devices. This results in the application of the higher potential to the brushes I' I² I³ I⁴ as the load increases, and by increasing the magnetization of the field structures produces an increase in the electromotive force at the armature terminals so as to practically prevent any drop due to loading.

In Figs. 5 and 6 I have shown other forms of commutator-rings, which may be used. The commutator-ring F² in Fig. 5 has its segments connected by resistances R which lessen the sparking. The commutator-ring F³ shown in Fig. 6 is simply a ring of high resistance material which may be substituted when very low electromotive forces are used for excitation.

I have described the operation of a machine embodying my invention when the rotor is caused to revolve in the same direction as the rotating field set up by the low frequency currents. My invention is not, however, limited to an apparatus operated in this manner, since the generator will be self-exciting for substantially the same reasons if the rotor is caused to rotate in the opposite direction to the field impressed upon it.

My invention may be embodied in various forms and I do not desire to be limited to what I have here shown and described, or to any particular number of phases, since by obvious modifications the form may be varied and any number of phases used. I have shown and described a two-phase system because it is the most simple for the purposes of illustration and explanation.

The terms "connecting" and "connected" as used in the claims referring to the connection of the commutator brushes with the derived circuits are intended to cover either a conductive or an inductive connection except where limited by the word "inductively."

What I claim is:—

1. The combination of an alternating-current generator, means for exciting its field magnets by alternating currents derived from the armature circuits, and a frequency setter for determining the periodicity of said generator.

2. The combination of an alternating current generator having induced armature windings connected to the supply mains, inducing field magnet windings, means for exciting said field magnet windings by alternating currents derived from the armature circuits and a frequency setter for determining the periodicity of said generator.

3. In combination, a main alternating-current generator, an auxiliary alternating-current generator supplying alternating current to the field magnet of the main alternating-current generator, a commutator connected to said field windings, and means for connecting the brushes of said commutator in derived circuit from the armature circuits of said main generator.

4. In combination, a main multiphase alternating-current generator, an auxiliary multiphase alternating-current generator supplying alternating currents to the field windings of said main generator, a commutator connected to said field windings and means for connecting the brushes of said commutator in derived circuit from the armature circuits of said main generator.

5. In combination, a main multiphase alternating-current generator, an auxiliary multiphase alternating-current generator supplying alternating currents to the field windings of said main generator, a commutator connected to said field windings, and means for inductively connecting the brushes of said commutator in derived circuits from the armature circuits of said main generator.

6. In combination, a main multiphase alternating-current generator, an auxiliary multiphase alternating-current generator supplying multiphase currents to the field windings of said main generator, said two generators having an equal number of phases, a commutator having its segments connected to said field windings, the brushes of said commutator being connected in derived circuit from the armature circuits of said main generator.

7. In combination, a main multiphase alternating current generator, an auxiliary multiphase alternating-current generator supplying alternating currents to the field-windings of said main generator, a commutator having its segments connected to the field-windings, the brushes of said commutator being connected in derived circuit from the armature circuits of the main generator, and transformers having their primaries in series with the armature windings and with the load and their secondaries in series with said brushes.

8. In combination, a main multiphase alternating-current generator, an auxiliary multiphase alternating-current generator of low periodicity supplying alternating-currents to the field-windings of said main generator, a commutator having its segments connected to the field-windings, and its brushes in derived circuits from the armature circuits of the main generator, and transformers having their primaries in series with the armature windings and with the load and their secondaries in said derived circuits.

JOHN FORREST KELLY.

Witnesses:
 H. B. BROWNELL,
 ROBT. S. ALLYN.